United States Patent
Xing

(10) Patent No.: US 12,056,938 B2
(45) Date of Patent: Aug. 6, 2024

(54) PARKING SPACE IDENTIFICATION METHOD AND APPARATUS, MEDIUM AND ELECTRONIC DEVICE

(71) Applicant: SUTENG INNOVATION TECHNOLOGY CO., LTD., Shenzhen (CN)

(72) Inventor: Zhiwei Xing, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/528,753

(22) Filed: Dec. 4, 2023

(65) Prior Publication Data
US 2024/0193962 A1   Jun. 13, 2024

(51) Int. Cl.
| | |
|---|---|
| G06V 20/58 | (2022.01) |
| G06V 10/22 | (2022.01) |
| G06V 10/26 | (2022.01) |
| G06V 10/98 | (2022.01) |
| G06V 20/70 | (2022.01) |

(52) U.S. Cl.
CPC .......... G06V 20/586 (2022.01); G06V 10/225 (2022.01); G06V 10/26 (2022.01); G06V 10/98 (2022.01); G06V 20/70 (2022.01)

(58) Field of Classification Search
CPC .... G06V 20/586; G06V 10/225; G06V 10/26; G06V 10/98; G06V 20/70
See application file for complete search history.

(56) References Cited

U.S. PATENT DOCUMENTS

| | | | | |
|---|---|---|---|---|
| 2018/0362082 | A1* | 12/2018 | Anderson | G08G 1/168 |
| 2020/0114904 | A1* | 4/2020 | Lee | G05D 1/0088 |
| 2020/0118310 | A1* | 4/2020 | Matsumoto | G06V 20/586 |
| 2021/0190947 | A1* | 6/2021 | Chang | G06V 20/586 |
| 2021/0323539 | A1* | 10/2021 | Muto | G06V 20/58 |
| 2021/0375135 | A1* | 12/2021 | Yang | G06V 20/56 |
| 2022/0073056 | A1* | 3/2022 | Hüger | B62D 15/027 |
| 2023/0192070 | A1* | 6/2023 | Wang | B62D 15/0285 |
| | | | | 701/25 |

FOREIGN PATENT DOCUMENTS

CN      112766136 A      5/2021

OTHER PUBLICATIONS

CN112766136 Translation (Year: 2021).*
First Office Action issued in related Chinese Application No. 202211560566.0, mailed Jan. 28, 2023, 15 pages.

* cited by examiner

*Primary Examiner* — Ming Y Hon
(74) *Attorney, Agent, or Firm* — BAYES PLLC

(57) ABSTRACT

This disclosure provides a parking space identification method, a parking space identification apparatus, a computer-readable storage medium, and an electronic device, and relates to the field of smart transportation technology. The method includes: obtaining an around-view image of a target vehicle and determining a target region from the around-view image; segmenting the target region in a target direction to obtain multiple grids, where the target direction is perpendicular to a driving direction of the target vehicle; and determining a parking space based on image semanteme information corresponding to the multiple grids separately.

8 Claims, 14 Drawing Sheets

PARKING SPACE IDENTIFICATION METHOD AND APPARATUS, MEDIUM AND ELECTRONIC DEVICE

CROSS-REFERENCE TO RELATED APPLICATION

The present application claims the benefit of priority to Chinese Patent Application No. 202211560566.0, filed on Dec. 7, 2022, which is hereby incorporated by reference in its entirety.

TECHNICAL FIELD

This disclosure relates to the field of smart transportation technology, and in particular, to a parking space identification method and apparatus, a computer-readable storage medium, and an electronic device.

TECHNICAL BACKGROUND

In conventional parking space identification solutions, ultrasonic radar sensors are mainly used for detection and vehicles in adjacent parking spaces are required. Therefore, efficiency of identifying the parking spaces needs to be improved.

SUMMARY

This disclosure provides a parking space identification method, a parking space identification apparatus, a computer-readable storage medium, and an electronic device, which can improve accuracy and efficiency of identifying a parking space to some extent.

Other features and advantages of this disclosure should be readily understood based on the following detailed descriptions or be learned partially through practice of this disclosure.

According to an aspect of this disclosure, a parking space identification method is provided, and the method includes: obtaining an around-view image of a target vehicle and determining a target region from the around-view image; segmenting the target region in a target direction to obtain multiple grids, where the target direction is perpendicular to a driving direction of the target vehicle; and determining a parking space based on image semanteme information corresponding to the multiple grids separately.

In an embodiment, after obtaining an around-view image of a target vehicle, the method further includes: performing semantic segmentation processing on the around-view image to position a target object in the around-view image, where there is at least one type of target object.

In an embodiment, target regions are on two sides of the target vehicle; and segmenting the target region in a target direction to obtain multiple grids includes: segmenting the target region in the target direction to obtain the multiple grids and image semanteme information corresponding to each grid, where the image semanteme information corresponding to each grid includes: a type of target object included in an image region corresponding to the grid, and the number of pixels of each type of target object; and image semanteme information corresponding to an auxiliary grid includes: a type of target object included in an image region corresponding to the auxiliary grid, and the number of pixels of each type of target object.

In an embodiment, determining a parking space based on image semanteme information corresponding to the multiple grids separately includes: encoding the multiple grids separately based on the image semanteme information corresponding to the multiple grids separately, where when it is determined that the image region corresponding to the grid includes at least one type of target object based on the image semanteme information, and the number of pixels of the at least one type of target object is not less than a corresponding pixel threshold, the grid is encoded as a first identification code, or otherwise, the grid is encoded as a second identification code; and when the number of grids encoded as the second identification code meets a preset condition within a preset distance range, determining that an image region corresponding to the preset distance range corresponds to a parking space, where the preset distance range is related to actual width of the parking space.

In an embodiment, after determining that an image region corresponding to the preset distance range corresponds to a parking space, the method further includes: for a preset number of target grids at edge positions in all grids within the preset distance range, determining whether the target grid corresponds to intended parking space lines based on the image semanteme information corresponding to the target grid and the image semanteme information corresponding to the auxiliary grid, where the auxiliary grid is an adjacent grid of the target grid.

In an embodiment, determining whether the target grid corresponds to intended parking space lines based on the image semanteme information corresponding to the target grid and the image semanteme information corresponding to the auxiliary grid includes: determining whether the target grid meets a condition to be encoded as the first identification code; determining whether there is a grid encoded as the second identification code in the auxiliary grid; and when the target grid is encoded as the first identification code and there is a grid encoded as the second identification code in the auxiliary grid, determining that the target grid corresponds to intended parking space lines.

In an embodiment, after determining that an image region corresponding to the preset distance range corresponds to a parking space, the method further includes: based on the image semanteme information of the grid, determining whether the image region corresponding to the grid includes pixels of a parking space line type and the number of pixels is not less than a pixel threshold of the parking space line type; and when the grid includes the pixels of the parking space line type and the number of pixels is not less than the pixel threshold of the parking space line type, determining that the grid corresponds to the parking space lines.

In an embodiment, before determining a parking space based on image semanteme information corresponding to the multiple grids separately, the method further includes: when it is determined that there is a distorted image region in the around-view image based on the image semanteme information of the around-view image, obtaining at least one frame of auxiliary image again; determining a partial image region corresponding to the distorted image region based on the at least one frame of auxiliary image; and determining an amount of distortion based on image semanteme information of the partial image region.

In an embodiment, determining an amount of distortion based on image semanteme information of the partial image region includes: segmenting the partial image region in the target direction to obtain N grids, where N is set to an integer greater than 1; encoding an $i^{th}$ grid based on image semanteme information of the $i^{th}$ grid, where when an image region corresponding to the $i^{th}$ grid includes pixels of a vehicle type and the number of pixels is not less than a pixel threshold corresponding to the vehicle type based on the image semanteme information, the $i^{th}$ grid is encoded as the first identification code, or otherwise, the $i^{th}$ grid is encoded as the second identification code, where i is set to a positive integer not greater than N; and determining the amount of distortion based on the number of grids identified as the first identification codes.

According to another aspect of this disclosure, a parking space identification apparatus is provided, where the apparatus includes: an obtaining module, a segmentation module, and a first determining module.

The obtaining module is configured to obtain an around-view image of a target vehicle and determine a target region from the around-view image; the segmentation module is configured to segment the target region in a target direction to obtain multiple grids, where the target direction is perpendicular to a driving direction of the target vehicle; and the first determining module is configured to determine a parking space based on image semanteme information corresponding to the multiple grids separately.

According to another aspect of this disclosure, an electronic device is provided, including a memory, a processor, and a computer program stored in the memory and capable of running on the processor, where when the processor executes the computer program, the parking space identification method in the foregoing embodiment is implemented.

According to another aspect of this disclosure, a non-transitory computer-readable storage medium is provided, storing a computer program, where when the computer program is executed by a processor, the parking space identification method in the foregoing embodiment is implemented.

In the technical solution provided in this application, the target region is determined from the around-view image of the target vehicle and the target region is segmented in a target direction perpendicular to a driving direction of the target vehicle, to obtain the multiple grids. Further, a parking space can be determined based on image semanteme information corresponding to the multiple grids separately. Through the parking space identification solution provided in the embodiments of this specification, the parking space can be quickly and accurately determined, thereby implementing high parking space identification efficiency.

BRIEF DESCRIPTION OF DRAWINGS

The accompanying drawings herein are incorporated in this specification as a part of this specification, show embodiments in compliance with this disclosure, and are used together with this specification to illustrate this disclosure. Apparently, the accompanying drawings in the following descriptions show merely some embodiments of this disclosure.

FIG. 6b is a schematic diagram of encoding the grid in FIG. 6a.

DETAILED DESCRIPTION

To make objectives, technical solutions and advantages of this disclosure clearer, embodiments of this disclosure are further described in detail below with reference to the accompanying drawings.

When the following description refers to the drawings, unless otherwise indicated, the same numbers in different drawings indicate the same or similar elements. Implementations described in the following exemplary embodiments do not represent all the implementations consistent with those in this disclosure.

Then the embodiments are described more comprehensively with reference to the accompanying drawings. However, exemplary embodiments can be implemented in various forms and should not be construed as being limited to examples illustrated herein; instead, these embodiments are provided so that this disclosure is more comprehensive and complete. The features, structures or characteristics may be integrated in one or more embodiments in any applicable method. In the following descriptions, many details are provided for ease of full understanding of the embodiments of this disclosure. However, to implement a technical solution in this disclosure, one or more details may be omitted, or other methods, components, apparatuses, steps and the like may be used.

In addition, the accompanying drawings are merely schematic diagrams of this disclosure and are not necessarily drawn to scale. The same reference signs in the figures denote the same or similar parts, and therefore are not described repeatedly. Some block diagrams shown in the figures are functional entities and are not necessarily corresponding to physically or logically independent entities. These functional entities may be implemented in a form of software or may be implemented in one or more hardware modules or integrated circuits, or in different networks and/or processor apparatuses and/or microcontroller apparatuses.

Embodiments of a parking space identification method provided in this disclosure are described in detail below with reference to FIGS. 1-10.

Figure 1:
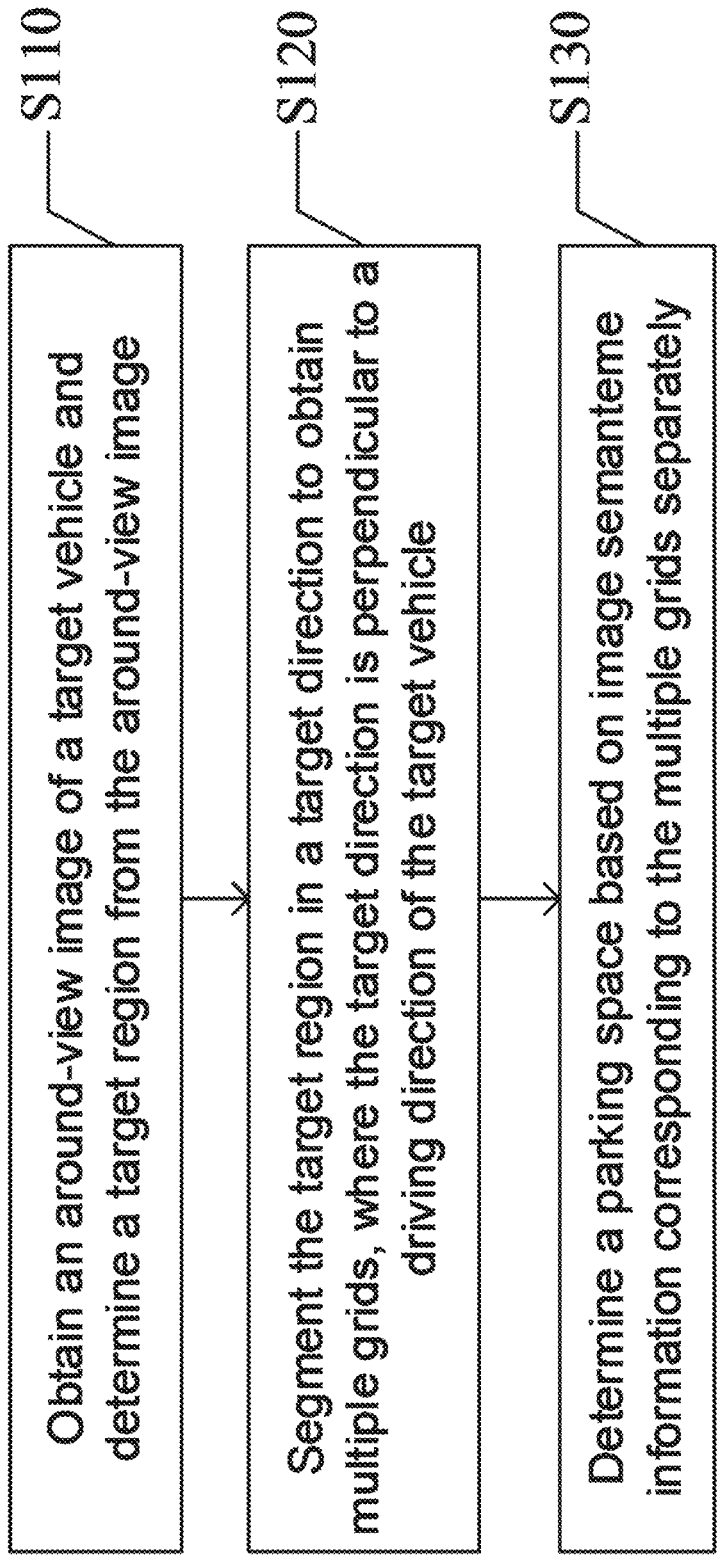
FIG. 1 is a schematic flowchart of a parking space identification method according to an embodiment.
Figure 2:
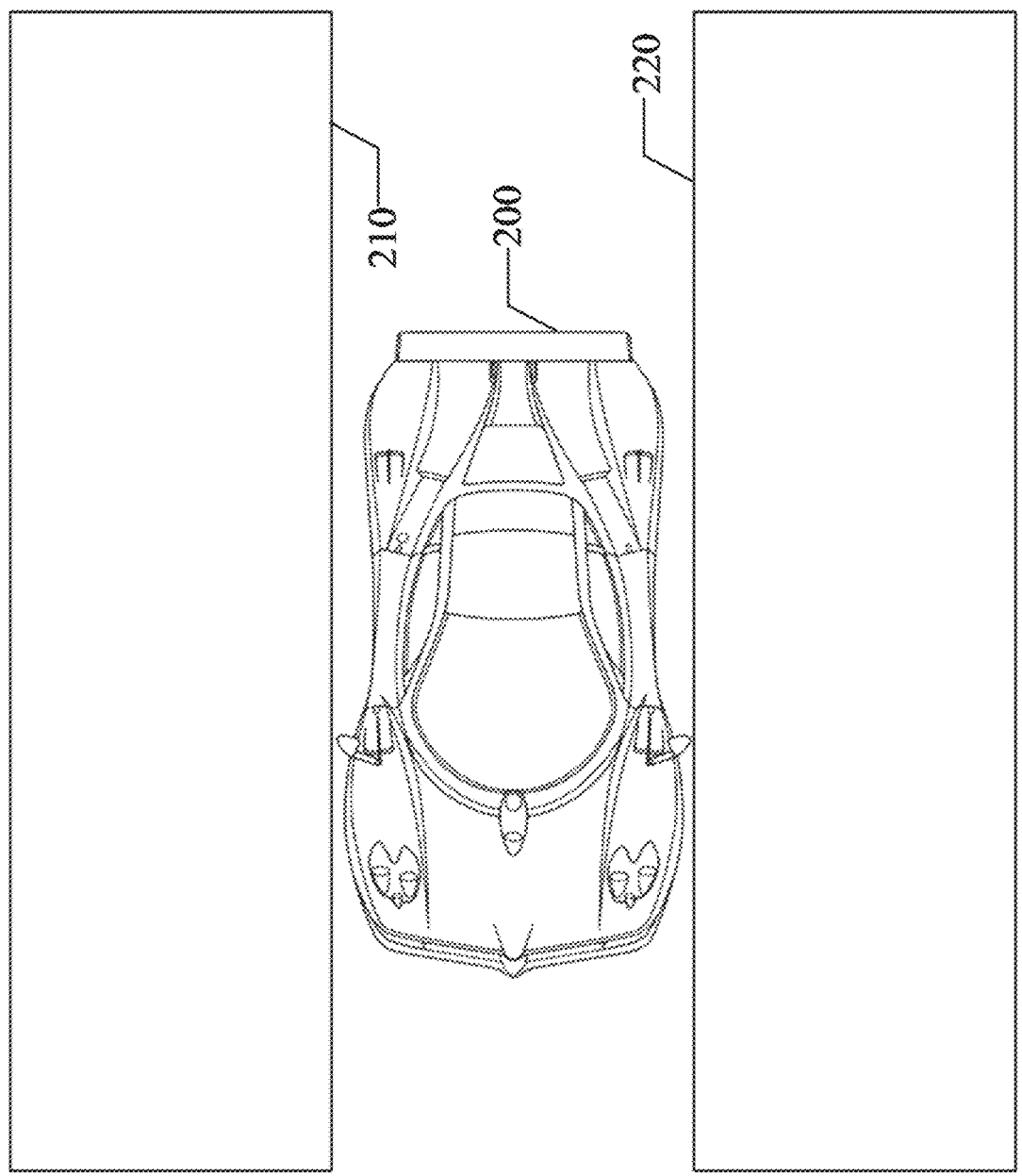
FIG. 2 is a schematic diagram of a target vehicle and a target region according to an embodiment.

FIG. 1 is a schematic flowchart of a parking space identification method according to an exemplary embodiment of this disclosure. Referring to FIG. 1, an embodiment shown in the figure includes: steps S110-S130.

S110. Obtain an around-view image of a target vehicle and determine a target region from the around-view image.

In an embodiment, the target vehicle is any vehicle for which a parking space needs to be determined. The around-view image of the target vehicle can be determined via images captured by fish-eye cameras mounted around a body of the target vehicle. In an exemplary embodiment, after distortion correction, transformation of an angle of view and further splicing processing of the images captured by the cameras, the around-view image of the target vehicle can be obtained. The around-view image of the target vehicle includes a 360-degree panoramic image about an environment where the target vehicle is located. In the solution provided in this embodiment, parking space information in the current environment is determined based on the around-view image obtained by the target vehicle in real time, which is beneficial to identification timeliness of the parking space.

In an embodiment, the target region in the panoramic image of the target vehicle is further processed for identification of the parking space. In other words, a region other than the target region in the panoramic image is not involved in a subsequent calculation, which can reduce the amount of calculation and help further improve the recognition timeliness of the parking space.

S120. Segment the target region in a target direction to obtain multiple grids, where the target direction is perpendicular to a driving direction of the target vehicle.

In an embodiment of this specification, a front direction of the vehicle is denoted as a front side of the vehicle body, a rear direction is denoted as a rear side of the vehicle body, and door sides are denoted as left and right sides of the vehicle body.

In an embodiment, an applicable scenario of the parking space identification solution is generally a parking lot, and in this scenario, the parking spaces are generally on the left and/or right side of the vehicle body. Therefore, referring to FIG. 2, in an embodiment, image regions (region 210 and/or region 220) on the left and/or right side of the vehicle body that are determined from the around-view image of the target vehicle 200 are used as the target regions. In an embodiment, a partial region with a high value is determined from the around-view image, which helps improve recognition efficiency. The region 210 and the region 220 are used as examples of target regions for description.

Figure 3:
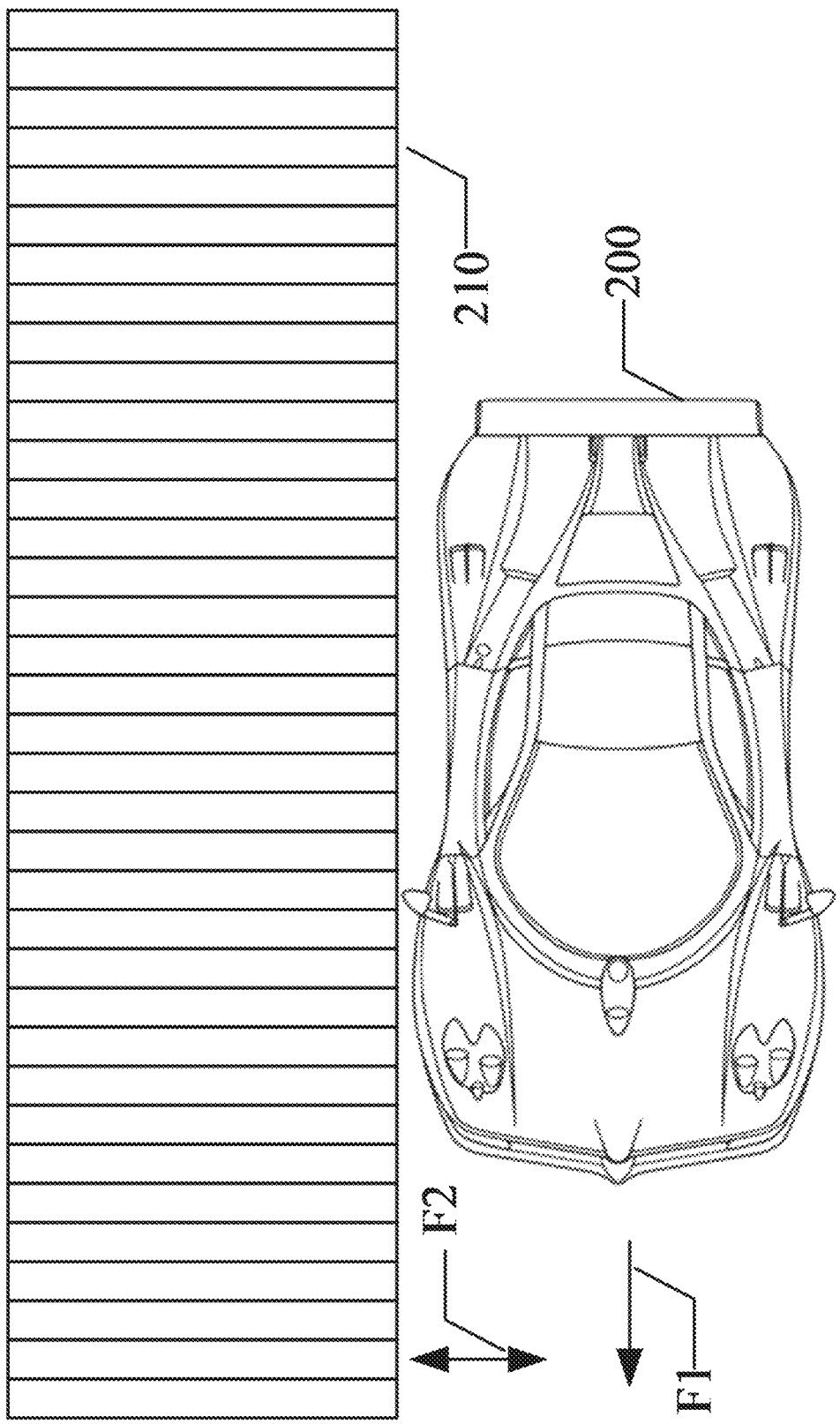
FIG. 3 is a schematic diagram of segmenting a target region into grids according to an embodiment.

In an embodiment, FIG. 3 is a schematic diagram of segmenting a target region into grids according to an embodiment. Referring to FIG. 3, the target regions (region 210 and region 220) are segmented in a direction F2 perpendicular to a driving direction F1 of the target vehicle 200 to obtain the multiple grids. Exemplarily, width of the divided grid is adapted to width of the parking space lines, and a specific width setting of the grid should depend on a factor such as resolution of the around-view image. In some embodiments, the width of the divided grid corresponds to the width of the parking space lines in reality, and is exemplarily between 20 cm and 25 cm.

Reference is made to FIG. 1, S130. Determine a parking space based on image semanteme information corresponding to the multiple grids separately.

Figure 4:
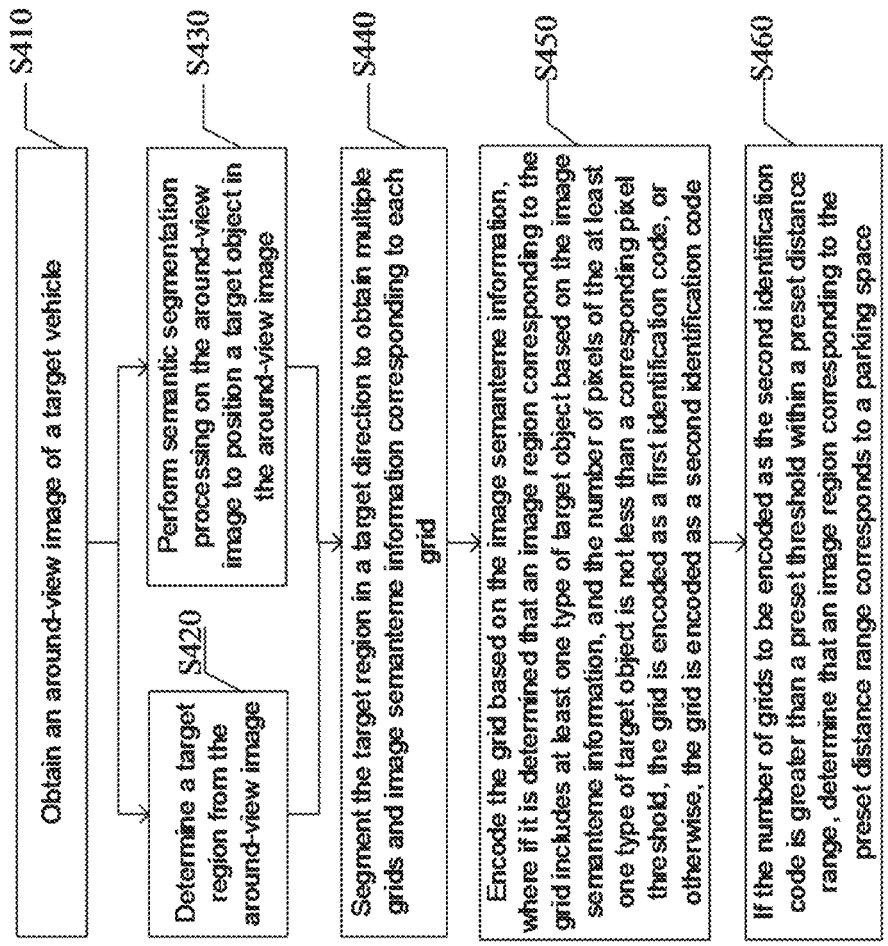
FIG. 4 is a schematic flowchart of a parking space identification method according to an embodiment.
Figure 5:
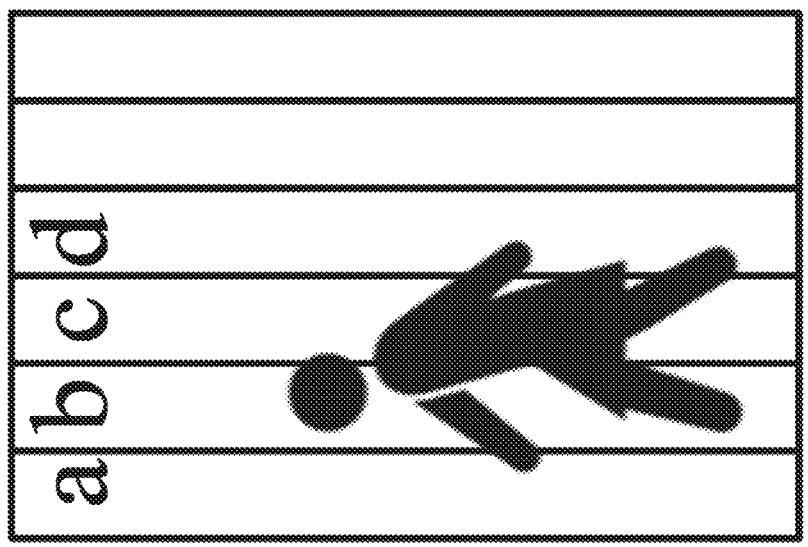
FIG. 5 is a schematic diagram of a target object included in an image region corresponding to a grid according to an embodiment.

In an embodiment, FIG. 4 is a schematic flowchart of a parking space identification method according to another embodiment.

Reference is made to FIG. 4. S410. Obtain an around-view image of a target vehicle. S420. Determine a target region from the around-view image. Specific embodiments of S410 and S420 are consistent with the corresponding embodiment of S110.

S430. Perform semantic segmentation processing on the around-view image to position a target object in the around-view image. Embodiments of S430 and S420 are not in any sequence. S420 and S430 can be performed simultaneously, or S420 can be performed before S430, or S430 can be performed before S420.

In an embodiment, the semantic segmentation processing may be implemented through a semantic segmentation algorithm. Through the semantic segmentation processing, a label or a type can be associated with each pixel in the around-view image. Further, pixels belonging to the same type or label are classified into the same type, so that target objects of different types in the around-view image can be positioned. For example, through the semantic segmentation processing, a set of pixels corresponding to vehicles, a set of pixels corresponding to pedestrians, a set of pixels corresponding to traffic signals and signs, and a set of pixels corresponding to sidewalks in the around-view image can be positioned.

In an embodiment, the target object includes at least one type such as parking space lines and obstacles (including pedestrians and other vehicles). Exemplarily, when the around-view image A includes the obstacle and the parking space lines, by subjecting the around-view image to the semantic segmentation processing, the set of pixels corresponding to the parking space lines and the set of pixels corresponding to the obstacle in the around-view image A can be positioned. In this embodiment, the image can be split into multiple channels based on the number of types of target objects included in the around-view image A. For example, when the around-view image A includes the parking space lines and the obstacle, the around-view image A can be split into a channel 1 of the set of pixels corresponding to the parking space lines and a channel 2 of the set of pixels corresponding to the obstacle. Further, to improve an image processing speed, each channel can be binarized to facilitate counting of the number of pixels of each type of target object within each grid.

In an embodiment, after S420 of determining the target region (for example, the region 210 and the region 220 in FIG. 2) and S430 of positioning each type of target object in the around-view image, the following step is performed. S440. Segment the target region in a target direction to obtain multiple grids and image semanteme information corresponding to each grid.

The image semanteme information corresponding to one grid includes: a type of target object (for example, referring to FIG. 5, the types of target objects included in the image regions corresponding to grids a to d are pedestrians) included in an image region corresponding to the grid, and the number of pixels of each type of target object. In some embodiments, the around-view image A includes two types of target objects and is split into two channels. After the target region in the around-view image A is segmented, for any grid a, the image semanteme information corresponding to the grid a is related to the two channels. On the one hand, the image semanteme information concerns whether the parking space lines in the channel 1 are distributed at the grid a, and concerns the number of distributed pixels. On the other hand, the image semanteme information concerns whether the obstacle in the channel 2 is distributed at the grid a, and concerns the number of distributed pixels.

Reference is still made to FIG. 4. S450. Encode the grid based on the image semanteme information, where when it is determined that an image region corresponding to the grid includes at least one type of target object based on the image semanteme information, and the number of pixels of the at least one type of target object is not less than a corresponding pixel threshold, the grid is encoded as a first identification code, or otherwise, the grid is encoded as a second identification code.

In an embodiment, the grid is encoded based on the image semanteme information corresponding to each grid. In some embodiments, when the image semanteme information corresponding to the grid meets the first preset condition, the grid is encoded as a first identification code, for example, "1." When the image semanteme information corresponding to the grid does not meet the first preset condition, the grid is encoded as a second identification code, for example, "0." The first preset condition is as follows: the image region corresponding to one grid includes at least one type of target object, and the number of pixels of the at least one type of target object is not less than a corresponding pixel threshold.

The pixel threshold corresponding to each type of target object can be determined according to actual needs, and therefore, pixel thresholds corresponding to different types of target objects may be different. For example, referring to FIG. 6a, a pixel threshold corresponding to a circle-type target object is 2, a pixel threshold corresponding to an ellipse-type target object is 1, and a pixel threshold corresponding to a square-type target object is 3. Further, based on the pixel thresholds, it is determined whether each grid in FIG. 6a meets the first preset condition, and then each grid is encoded. Details are as follows:

For a grid e, corresponding image semanteme information is as follows: the corresponding image region includes two types of target objects (namely, the circle type and the ellipse type), the actual number of pixels of the circle-type target object is 1, and the actual number of pixels of the ellipse-type target object is 2. The number (1) of pixels of the circle-type target object is less than the pixel threshold (2) corresponding to the circle-type target object, and the actual number (2) of pixels of the ellipse-type target object is greater than the pixel threshold (1) corresponding to the ellipse-type target object. The number of pixels of one type of target object is not less than the corresponding pixel threshold. Therefore, the grid e satisfies the first preset condition, and the grid is encoded as "1."

For a grid f, corresponding image semanteme information is as follows: the corresponding image region includes two types of target objects (namely, the circle type and the ellipse type), the actual number of pixels of the circle-type target object is 3, and the actual number of pixels of the ellipse-type target object is 1. The actual number (3) of pixels of the circle-type target object is not less than the pixel threshold (2) corresponding to the circle-type target object, and the actual number (1) of pixels of the ellipse-type target object is also not less than the pixel threshold (1) corresponding to the ellipse-type target object. The numbers of pixels of two types of target objects are not less than the corresponding pixel threshold. Therefore, the grid f satisfies the first preset condition, and the grid is encoded as "1."

For a grid g, corresponding image semanteme information is as follows: the corresponding image region includes two types of target objects (namely, the square type and the ellipse type), the actual number of pixels of the square-type target object is 2, and the actual number of pixels of the ellipse-type target object is 1. The actual number (2) of pixels of the square-type target object is less than the pixel threshold (3) corresponding to the square-type target object, and the actual number (1) of pixels of the ellipse-type target object is not less than the pixel threshold (1) corresponding to the ellipse-type target object. The number of pixels of one type of target object is not less than the corresponding pixel threshold. Therefore, the grid g satisfies the first preset condition, and the grid is encoded as "1."

Likewise, it can be determined that a grid h also meets the first preset condition. Because image regions corresponding to a grid x, a grid y, and a grid z do not include any type of target object, none of the grid x, the grid y, and grid z meets the first preset condition, and the grid x, the grid y, and the grid z are all encoded as "0."

Figure 6A:
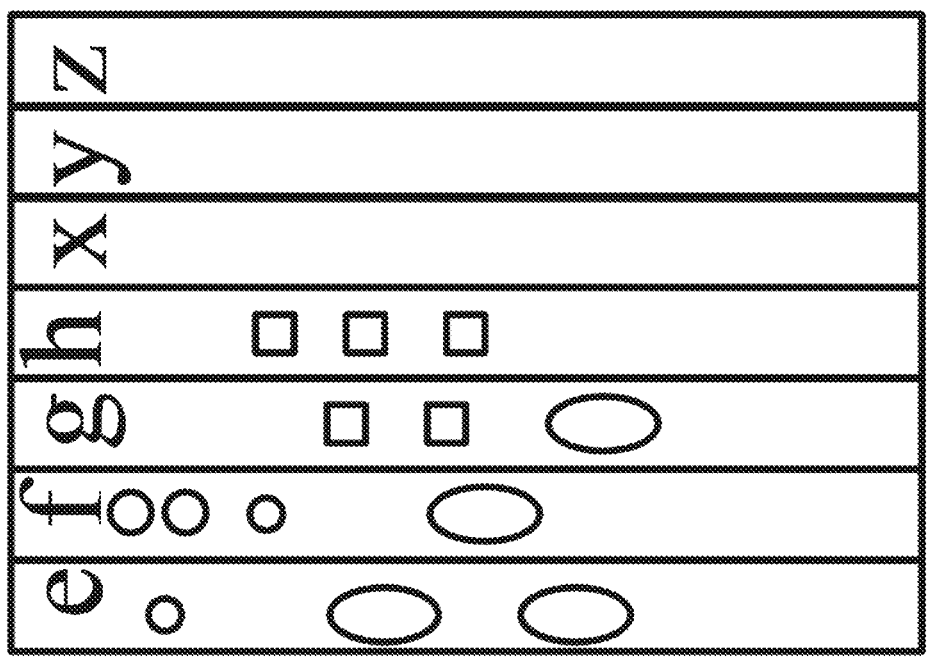
FIG. 6a is a schematic diagram of image semanteme information corresponding to a grid according to an embodiment.
Figure 6B:
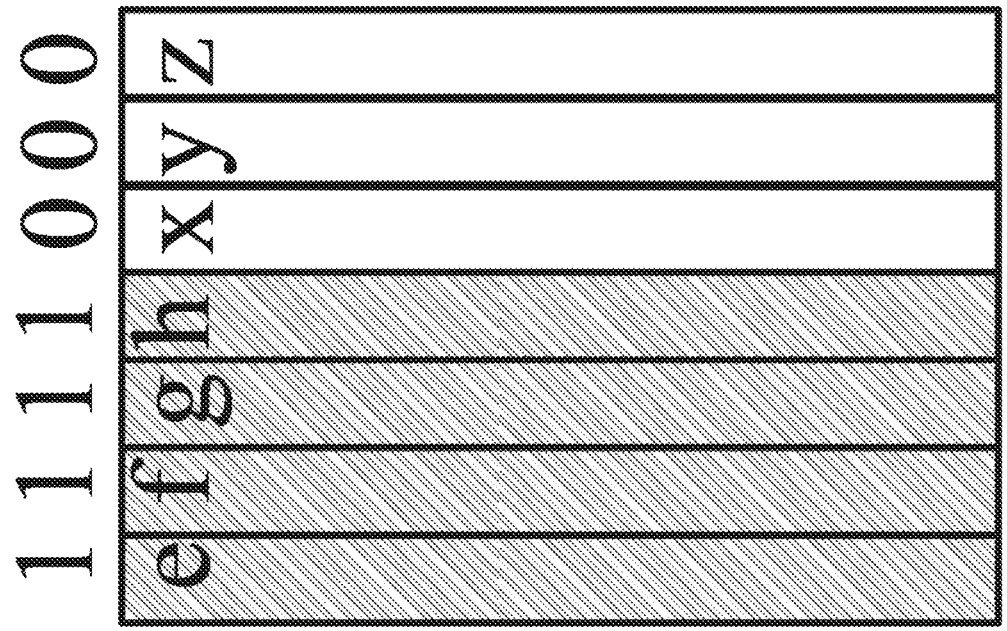

As shown in FIG. 6b, the grids shown in FIG. 6b are encoded based on whether each grid in FIG. 6a meets the first preset condition. Exemplarily, the grid encoded as "1" may be marked with slashes to form a shaded region.

All grids can be encoded by determining whether image semanteme information corresponding to the grids satisfies the first preset condition. Further, the following step S460 is performed: when the number of grids encoded as the second identification code meets a preset condition within a preset distance range, determine that an image region corresponding to the preset distance range corresponds to a parking space.

The preset distance range is related to width of the parking space. In an embodiment, when the width of the parking space is 2.4 meters, the preset distance range can be determined to be, for example, [28, 32] millimeters based on a ratio of the captured image to an actual environment. Exemplarily, to ensure identification accuracy, a certain margin can be set, that is, the minimum value of the preset distance range is greater than a mapped value of the actual width of the parking space in the image.

Figure 7:
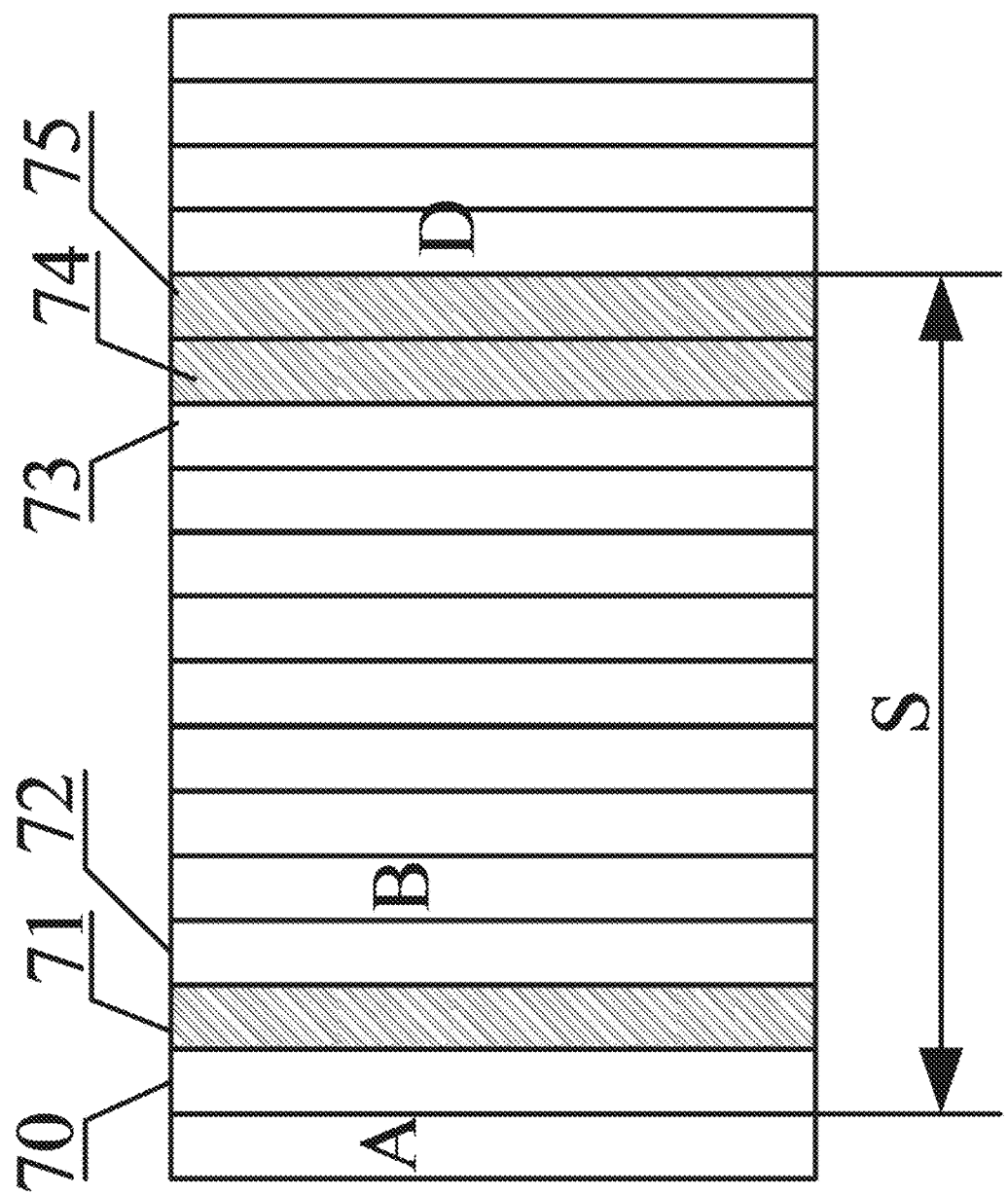
FIG. 7 is a schematic diagram of a group of grids within a preset distance range according to an embodiment.

In an embodiment, the preset condition (denoted as the second preset condition) may be that a percentage of the number of grids encoded as the second identification code in the total number of grids within the preset distance range is greater than the preset value (for example, 95%), or the second preset condition may be that the number of grids encoded as the second identification code is greater than a preset value (for example, 50). FIG. 7 is a schematic diagram of a group of grids within a preset distance range according to an embodiment. Referring to FIG. 7, when "S" satisfies the preset distance range, and the number of grids encoded as "0" within the range also meets the preset condition, it indicates that there are a number of grids encoded as the second identification code "0" within the preset distance range, that is, there is no target object in a large area in the region, and therefore, the region can be used as a parking location, and it can be determined that the image region corresponding to the preset distance range corresponds to the parking space.

Figure 8:
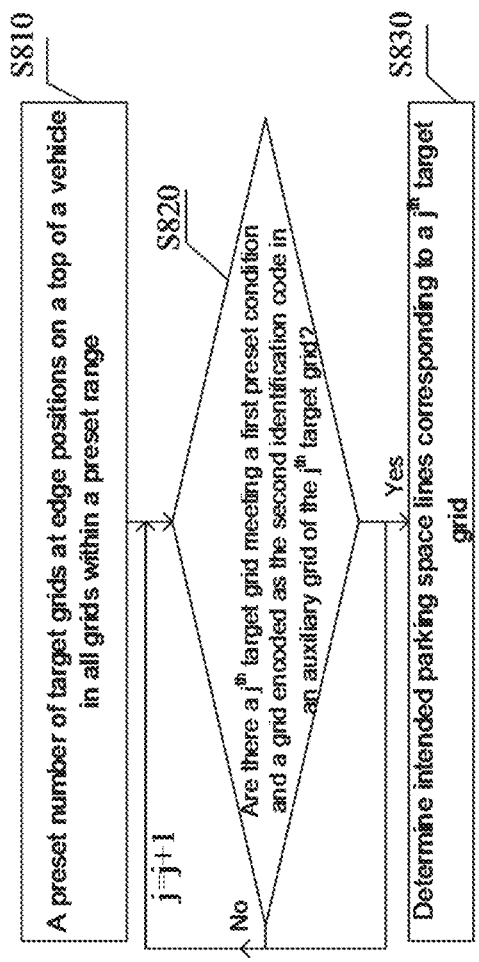
FIG. 8 is a schematic flowchart of a positioning method for intended parking space lines according to an embodiment.

In an embodiment, to further improve the positioning accuracy of the parking space, an embodiment provides solutions for positioning "intended parking space lines" and "parking space lines." By positioning the intended parking space lines and the parking space lines, a more accurate parking prompt can be provided for a driver, thereby helping improve parking safety. In some embodiments, FIG. 8 is a schematic flowchart of a positioning method for intended parking space lines according to an embodiment. The embodiment shown in the figure includes steps S810 to S830.

S810. Determine a preset number of target grids at edge positions from all grids within a preset distance range. Exemplarily, the preset number of target grids may be 3 to 5. For example, referring to FIG. 7, 3 target grids at the edge positions within the range "S" are grids 70-72 on the left side, or grids 73-75 on the right side.

In an embodiment, it is determined whether the target grid belongs to the parking space lines based on encoding of the target grid and encoding of the adjacent grid (denoted as an auxiliary grid) of the target grid. Exemplarily, the grid 70 is the first target grid (that is, a value of j is 1), and auxiliary grids of the grid 70 are a grid A and a grid 71.

In some embodiments, it can be determined whether the conditions shown in S820 are met: a $j^{th}$ target grid meets a first preset condition and there is a grid encoded as the second identification code in an auxiliary grid of the $j^{th}$ target grid. When the conditions are met, it can be determined that the $j^{th}$ target grid corresponds to the intended parking space lines (S830), and the $(j+1)^{th}$ target grid performs a determining condition in S820. When the conditions are not met, it is directly determined that the $(j+1)^{th}$ target grid performs the determining condition in S820.

In an embodiment, referring to FIG. 7, corresponding auxiliary grids of the grid 70 (j is set to 1) are the grid 71 and the grid A. When the grid 70 is encoded as "0" and meets the foregoing first preset condition, the grid 70 does not correspond to the intended parking space lines or the parking space lines, and the user does not need to avoid the position corresponding to the grid during parking.

In an embodiment, referring to FIG. 7, corresponding auxiliary grids of the grid 71 (j is set to 2) are the grid 72 and the grid B. The grid 71 is encoded as "1," which satisfies the foregoing first preset condition. The grid 72 and the grid B in the auxiliary grids are both encoded as "0," that is, there are grids encoded as the second identification codes in the auxiliary grids of the grid 71, and therefore, the grid 71 corresponds to the intended parking space lines. As the grid 71 is encoded as "1," it indicates that the current grid may correspond to an obstacle, the parking space lines, or the like. The current grid is denoted as "intended parking space lines 2." Further, during the parking process of the user, the user needs to be prompted to avoid the region corresponding to the grid 71.

An embodiment of this specification further provides a parking space line positioning solution, including: determining whether the image region corresponding to the grid includes pixels of a parking space line type and the number of pixels is not less than a pixel threshold of the parking space line type based on the image semanteme information of the grid. When the conditions are met, it indicates that the grid is the parking lines.

Through the parking space line positioning solution and the intended parking space line positioning solution, the obstacle that the user needs to avoid during the parking process can be determined, thereby improving parking safety.

Figure 9:
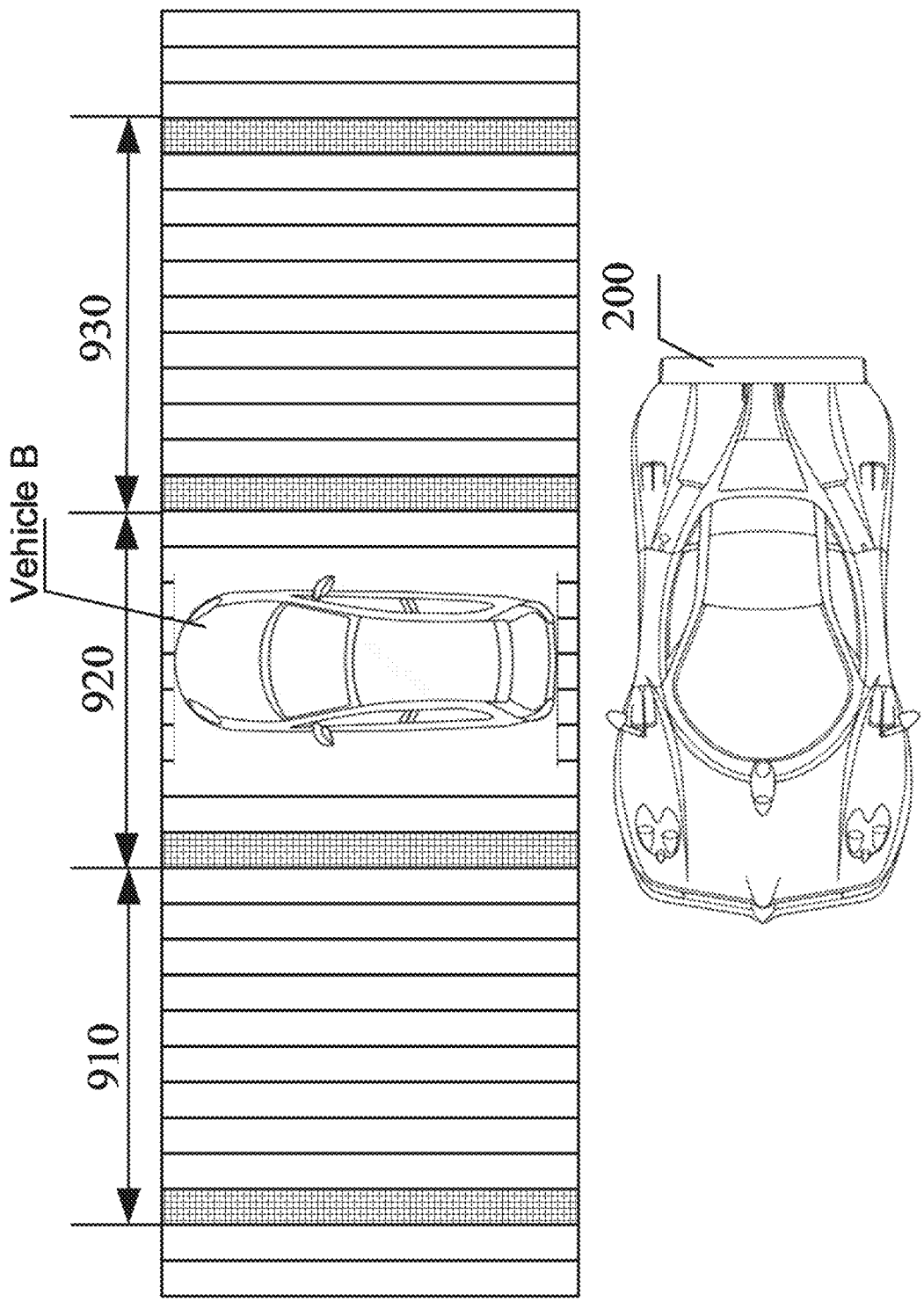
FIG. 9 is a schematic diagram of a target vehicle and a parked vehicle according to an embodiment.

In some cases, the parked vehicle (for example, a vehicle B) shown in the around-view image may be distorted, which causes an illusion that the vehicle B occupies two parking spaces. For example, FIG. 9 is a schematic diagram of a target vehicle and a parked vehicle according to an exemplary embodiment. Referring to FIG. 9, it can be determined that a region 910, a region 920, and a region 930 are all within the preset distance range. Assuming that the vehicle B is parked in a real environment corresponding to a region 920 in the image, the vehicle B in the around-view image obtained by the vehicle to be parked may be distorted, which causes the illusion that the vehicle B occupies the two parking spaces. That is, in addition to pixels of the vehicle type in the processed region 920, there are also pixels of the vehicle type in the region 910, but there is actually no vehicle parked in region 910. In view of such a case, an embodiment of this specification provides an embodiment of determining the amount of distortion. After the amount of distortion is determined, the parking space is determined, which helps further improve parking safety.

Figure 10:
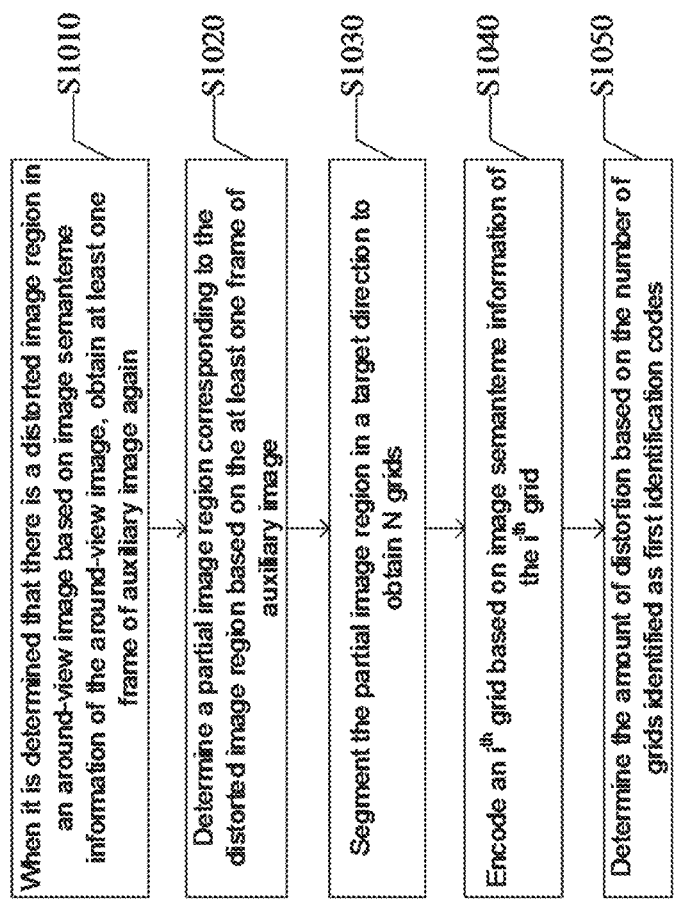
FIG. 10 is a schematic flowchart of a distortion determining method according to an embodiment.

FIG. 10 is a schematic flowchart of a distortion determining method according to an embodiment. Referring to FIG. 10, an embodiment shown in the figure includes steps S1010 to S1050.

S1010. When it is determined that there is a distorted image region in an around-view image based on image semanteme information of the around-view image, obtain at least one frame of auxiliary image again.

Exemplarily, the auxiliary image may be a 360-degree around-view image of the vehicle to be parked, or may be an image in a direction with a distortion problem.

S1020. Determine a partial image region corresponding to the distorted image region based on the at least one frame of auxiliary image.

Exemplarily, referring to FIG. 9, a partial image region determined in the auxiliary image is for example, the region 910.

S1030. Segment the partial image region in a target direction to obtain N grids. N is set to an integer greater than 1. The segmentation method is the same as the segmentation method in S120. In the segmentation process provided in this embodiment, width of the segmented grid can be related to the width of the parking space lines, or can be set to another value.

S1040. Encode an $i^{th}$ grid based on image semanteme information of the $i^{th}$ grid. Herein i is set to a positive integer not greater than N.

The $i^{th}$ semanteme information indicates whether the target object is included in the image region corresponding to the $i^{th}$ grid, and indicates the number of pixels corresponding to each type of target object when the target object is included.

An encoding method is consistent with an encoding method in the foregoing embodiment. That is, when it is determined that the image region corresponding to the grid includes pixels of a vehicle type based on the image semanteme information of the $i^{th}$ grid, and the number of pixels is not less than a corresponding pixel threshold corresponding to the vehicle type, the grid is encoded as a first identification code, or otherwise, the grid is encoded as a second identification code.

S1050. Determine the amount of distortion based on the number of grids identified as first identification codes.

When the number of grids encoded as "1" in the foregoing N grids is less than the grid threshold, it is determined whether a region between a first target grid and a second target grid corresponds to a parking space. The grid threshold can be determined according to an actual need. Exemplarily, when N is an even number, the grid threshold can be set to N/2, and when N is an odd number, the grid threshold can be set to (N+1)/2.

Referring to FIG. 9, the vehicle B is parked in the actual environment corresponding to the region 920, and therefore, the number of grids encoded as "1" in the region 920 is definitely greater than the grid threshold. However, there is actually no parked vehicle in the actual environment corresponding to the region 910, and therefore, the number of grids encoded as "1" in the region 910 should not exceed the grid threshold.

Further, the amount of existing distortion can also be determined by counting the number of grids encoded as "1," to provide assistance during determination of the parking space, which helps improve prompting accuracy for the parking and also improves the identification accuracy of the parking space.

Based on the solution provided in this specification, the parking space can be quickly and accurately detected via post-processing of a semantic segmentation result of the around-view image, thereby effectively improving the recognition efficiency of the parking space and helping the driver to park quickly and accurately.

The foregoing figures are only used to illustrate processes included in the method in the embodiment of the present invention. It is readily understood that the processes shown in the foregoing figures do not indicate or limit a chronological sequence of these processes. In addition, it is also readily understood that these processes may be performed synchronously or asynchronously, for example, in a plurality of modules.

An apparatus embodiment of this disclosure is provided below, and can be used to perform the method embodiments of this disclosure. For details not disclosed in this apparatus embodiment of this disclosure, refer to the method embodiments of this disclosure.

Figure 11:
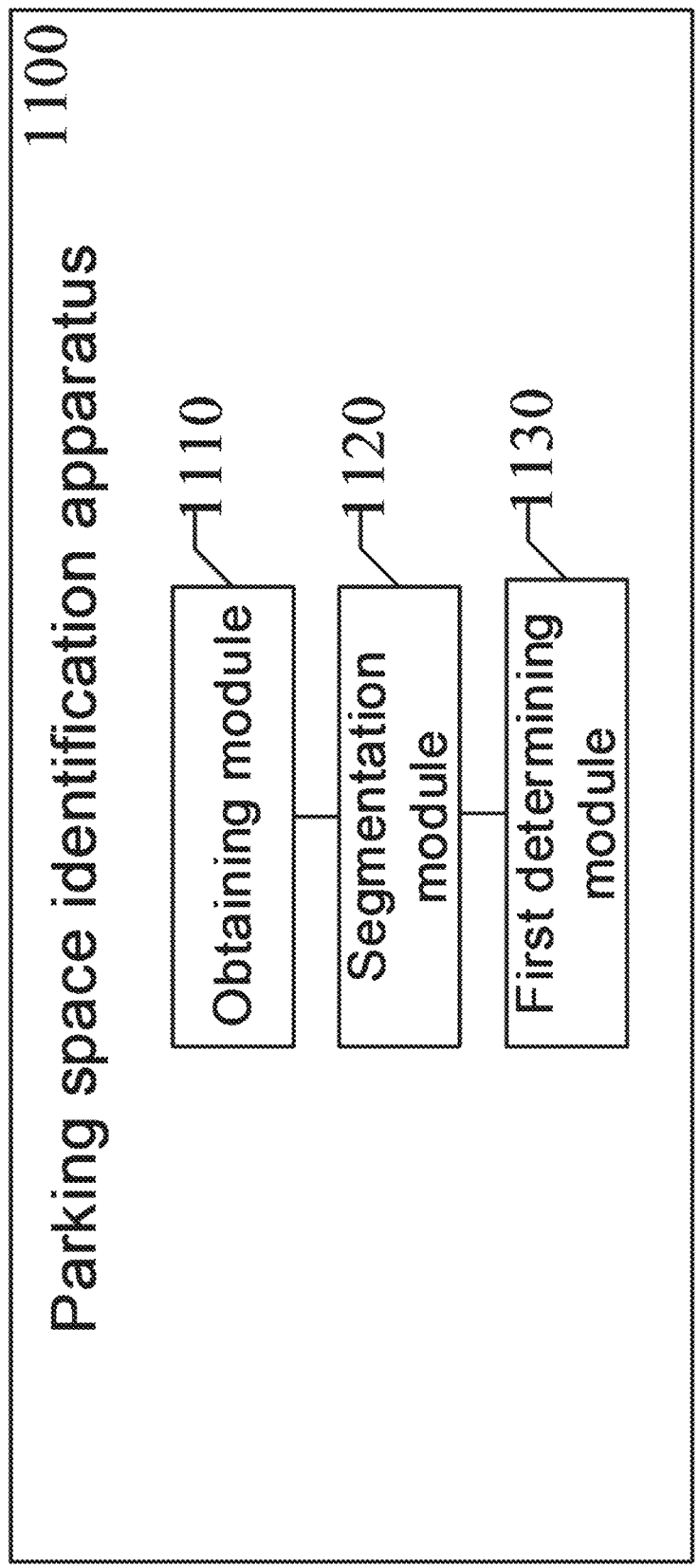
FIG. 11 is a schematic structural diagram of a parking space identification apparatus according to an embodiment.

FIG. 11 is a schematic structural diagram of a parking space identification apparatus according to an embodiment. Referring to FIG. 11, the parking space identification apparatus shown in the figure can be implemented as all or a part of an electronic device through software, hardware or a combination thereof, or can be integrated into the electronic device or a server as an independent module.

The parking space identification apparatus 1100 in this embodiment includes an obtaining module 1110, a segmentation module 1120, and a first determining module 1130.

The obtaining module 1110 is configured to obtain an around-view image of a target vehicle and determine a target region from the around-view image; the segmentation module 1120 is configured to segment the target region in a target direction to obtain multiple grids, where the target direction is perpendicular to a driving direction of the target vehicle; and the first determining module 1130 is configured to determine a parking space based on image semanteme information corresponding to the multiple grids separately.

Figure 12:
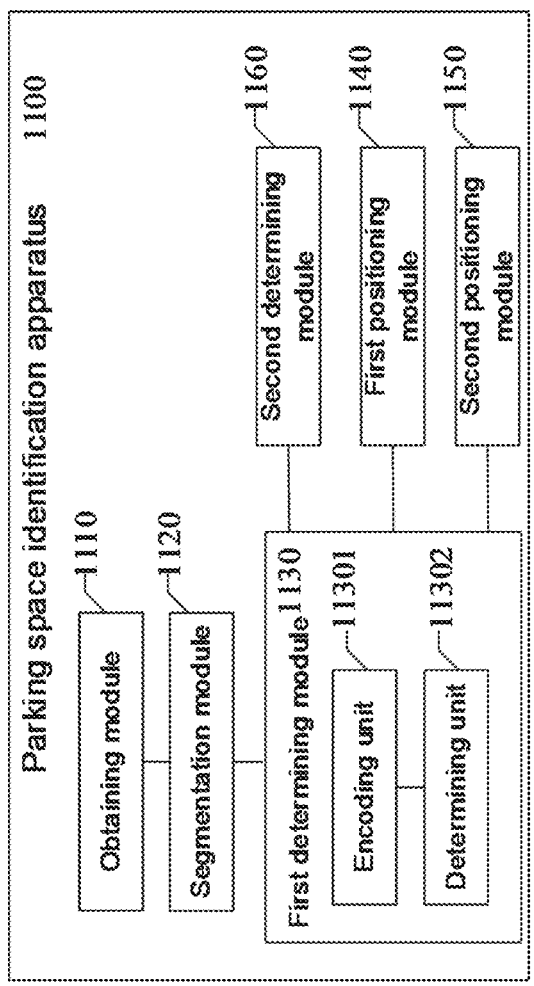
FIG. 12 is a schematic structural diagram of a parking space identification apparatus according to another embodiment.

In an embodiment, FIG. 12 is a schematic structural diagram of a parking space identification apparatus according to another embodiment. Reference is made to FIG. 12.

In an embodiment, after obtaining an around-view image of a target vehicle, the obtaining module 1110 is further configured to perform semantic segmentation processing on the around-view image to position a target object in the around-view image, where there is at least one type of target object.

In an embodiment, target regions are on two sides of the target vehicle.

The segmentation module 1120 is configured to segment the target region in the target direction to obtain the multiple grids and image semanteme information corresponding to each grid, where the image semanteme information corresponding to each grid includes: a type of target object included in an image region corresponding to the target grid, and the number of pixels of each type of target object; and image semanteme information corresponding to an auxiliary grid includes: a type of target object included in an image region corresponding to the auxiliary grid, and the number of pixels of each type of target object.

In an embodiment, the first determining module 1130 includes an encoding unit 11301 and a determining unit 11302.

The encoding unit 11301 is configured to: encode the multiple grids separately based on the image semanteme information corresponding to the multiple grids separately, where when it is determined that the image region corresponding to the grid includes at least one type of target object based on the image semanteme information, and the number of pixels of the at least one type of target object is not less than a corresponding pixel threshold, the grid is encoded as a first identification code, or otherwise, the grid is encoded as a second identification code; and the determining unit 11302 is configured to: when the number of grids encoded as the second identification code meets a preset condition within a preset distance range, determine that an image region corresponding to the preset distance range corresponds to a parking space, where the preset distance range is related to width of the parking space.

In an embodiment, the foregoing apparatus further includes a first positioning module 1140.

The first positioning module 1140 is configured to: for a preset number of target grids at edge positions in all grids within the preset distance range, determine whether the target grid corresponds to intended parking space lines based on the image semanteme information corresponding to the target grid and the image semanteme information corresponding to the auxiliary grid, where the auxiliary grid is an adjacent grid of the target grid.

In an embodiment, the first positioning module 1140 is configured to: determine whether the target grid meets a condition to be encoded as the first identification code; determine whether there is a grid encoded as the second identification code in the auxiliary grid; and when the target grid is encoded as the first identification code and there is the grid encoded as the second identification code in the auxiliary grid, determine that the target grid corresponds to intended parking space lines.

In an embodiment, the foregoing apparatus further includes a second positioning module 1150.

The second positioning module 1150 is configured to: determine whether the image region corresponding to the grid includes pixels of a parking space line type and the number of pixels is not less than a pixel threshold of the parking space line type based on the image semanteme information of the grid; and when the grid includes the pixels of the parking space line type and the number of pixels is not less than the pixel threshold of the parking space line type, determine that the grid corresponds to the parking space lines.

In an embodiment, the foregoing apparatus further includes a second determining module 1160.

The second determining module 1160 is configured to: when it is determined that there is a distorted image region in the around-view image based on the image semanteme information of the around-view image, obtain at least one frame of auxiliary image again; determine a partial image region corresponding to the distorted image region based on the at least one frame of auxiliary image; and determine an amount of distortion based on image semanteme information of the partial image region.

In an embodiment, the second determining module 1160 is configured to: segment the partial image region in the target direction to obtain N grids, where N is set to an integer greater than 1; encode an $i^{th}$ grid based on image semanteme information of the $i^{th}$ grid, where when it is determined that an image region corresponding to the $i^{th}$ grid includes pixels of a vehicle type and the number of pixels is not less than a pixel threshold corresponding to the vehicle type based on the image semanteme information, the $i^{th}$ grid is encoded as the first identification code, or otherwise, the $i^{th}$ grid is encoded as the second identification code, where i is set to a positive integer not greater than N; and determine the amount of distortion based on the number of grids identified as the first identification codes.

When the parking space identification apparatus provided in the foregoing embodiment performs the parking space identification method, division of the foregoing functional modules is used as an example for illustration. The foregoing functions can be allocated to different functional modules for implementation based on a requirement, that is, an inner structure of the device is divided into different functional modules to implement all or some of the functions described above. In addition, embodiments of the parking space identification apparatus and the parking space identification method provided in the foregoing embodiments belong to a same concept. Therefore, for details not disclosed in the apparatus embodiments of this disclosure, refer to the foregoing embodiment of the parking space identification method in this disclosure.

Serial numbers of the embodiments of this disclosure are only intended for description.

An embodiment further provides a computer-readable storage medium, storing a computer program, where when the program is executed by a processor, steps of the method in any one of the foregoing embodiments are implemented. The computer-readable storage medium may include, but is not limited to, any type of disk, including a floppy disk, an optical disk, a DVD, a CD-ROM, a microdrive, and a magneto-optical disk, a ROM, a RAM, an EPROM, an EEPROM, a DRAM, a VRAM, a flash memory device, a magnetic card or an optical card, nanosystem (including a molecular memory IC), or any type of medium or device suitable for storing an instruction and/or data.

An embodiment provides an electronic device, including a memory, a processor, and a computer program stored in the memory and capable of running on the processor, where when the processor executes the program, steps of the method in any one of the foregoing embodiments are implemented.

Figure 13:
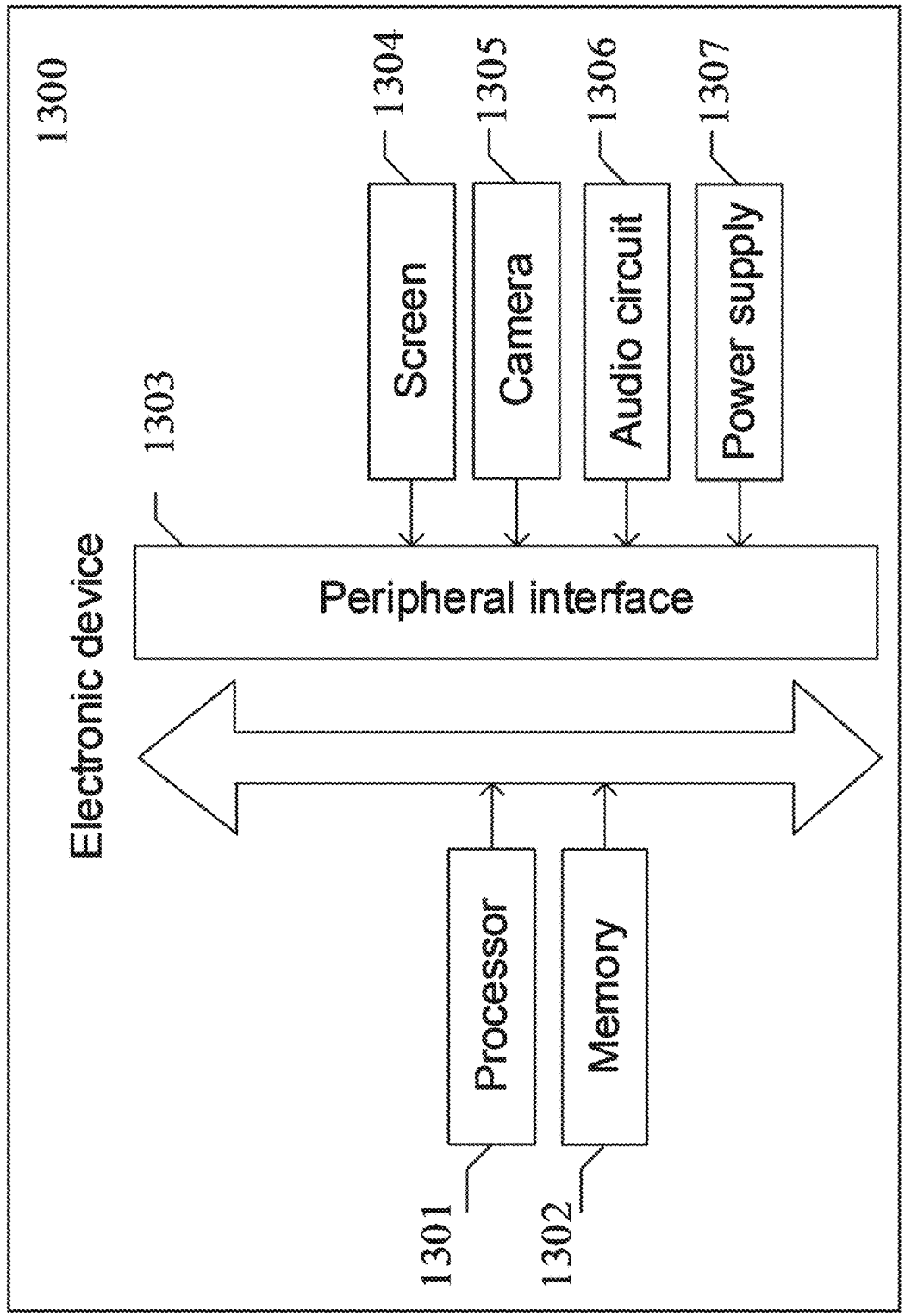
FIG. 13 is a schematic structural diagram of an electronic device according to an embodiment.

FIG. 13 is a schematic structural diagram of an electronic device according to an embodiment. Referring to FIG. 13, the electronic device 1300 includes: a processor 1301, and a memory 1302.

In an embodiment, the processor 1301 is a control center of a computer system, which may be a processor of a physical machine or a virtual machine. The processor 1301 may include one or more processing cores, such as a 4-core processor, an 8-core processor, and the like. The processor 1301 may be implemented in at least one hardware form of DSP (Digital Signal Processing), an FPGA (Field-Programmable Gate Array), and a PLA (Programmable Logic Array). The processor 1301 may also include a main processor and a coprocessor. The main processor is a processor configured to process data in a wakeup state and is also referred to as a CPU (Central Processing Unit); and the coprocessor is a low-power processor configured to process data in a standby state.

In an embodiment, the processor 1301 is configured to: obtain an around-view image of a target vehicle and determine a target region from the around-view image; segment the target region in a target direction to obtain multiple grids, where the target direction is perpendicular to a driving direction of the target vehicle; and determine a parking space based on image semanteme information corresponding to the multiple grids separately.

Further, the processor 1301 is further configured to: perform semantic segmentation processing on the around-view image after obtaining an around-view image of a target vehicle, to position a target object in the around-view image, where there is at least one type of target object.

Further, target regions are on two sides of the target vehicle; and segmenting the target region in a target direction to obtain multiple grids includes: segmenting the target region in the target direction to obtain the multiple grids and image semanteme information corresponding to each grid, where the image semanteme information corresponding to each grid includes: a type of target object included in an image region corresponding to the grid, and the number of pixels of each type of target object; and image semanteme information corresponding to an auxiliary grid includes: a type of target object included in an image region corresponding to the auxiliary grid, and the number of pixels of each type of target object.

Further, determining a parking space based on image semanteme information corresponding to the multiple grids separately includes: encoding the multiple grids separately based on the image semanteme information corresponding to the multiple grids separately, where when it is determined that the image region corresponding to the grid includes at least one type of target object based on the image semanteme information, and the number of pixels of the at least one type of target object is not less than a corresponding pixel threshold, the grid is encoded as a first identification code, or otherwise, the grid is encoded as a second identification code; and when the number of grids encoded as the second identification code meets a preset condition within a preset distance range, determining that an image region corresponding to the preset distance range corresponds to a parking space, where the preset distance range is related to actual width of the parking space.

Further, the processor 1301 is further configured to: for a preset number of target grids at edge positions in all grids within the preset distance range, determine whether the target grid corresponds to intended parking space lines based on the image semanteme information corresponding to the target grid and the image semanteme information corresponding to the auxiliary grid after determining that an image region corresponding to the preset distance range corresponds to a parking space, where the auxiliary grid is an adjacent grid of the target grid.

Further, determining whether the target grid corresponds to intended parking space lines based on the image semanteme information corresponding to the target grid and the image semanteme information corresponding to the auxiliary grid includes: determining whether the target grid meets a condition to be encoded as the first identification code; determining whether there is a grid encoded as the second identification code in the auxiliary grid; and when the target grid is encoded as the first identification code and there is the grid encoded as the second identification code in the auxiliary grid, determining that the target grid corresponds to intended parking space lines.

Further, the processor 1301 is further configured to: determine whether the image region corresponding to the grid includes pixels of a parking space line type and the number of pixels is not less than a pixel threshold of the parking space line type based on the image semanteme information of the grid after determining that an image region corresponding to the preset distance range corresponds to a parking space; and when the grid includes the pixels of the parking space line type and the number of pixels is not less than the pixel threshold of the parking space line type, determine that the grid corresponds to the parking space lines.

Further, the processor 1301 is further configured to: when it is determined that there is a distorted image region in the around-view image based on the image semanteme information of the around-view image, obtain at least one frame of auxiliary image again before determining a parking space based on image semanteme information corresponding to the multiple grids separately; determine a partial image region corresponding to the distorted image region based on the at least one frame of auxiliary image; and determine an amount of distortion based on image semanteme information of the partial image region.

Further, determining an amount of distortion based on image semanteme information of the partial image region includes: segmenting the partial image region in the target direction to obtain N grids, where N is set to an integer greater than 1; encoding an $i^{th}$ grid based on image semanteme information of the $i^{th}$ grid, where when it is determined that an image region corresponding to the $i^{th}$ grid includes pixels of a vehicle type and the number of pixels is not less than a pixel threshold corresponding to the vehicle type based on the image semanteme information, the $i^{th}$ grid is encoded as the first identification code, or otherwise, the $i^{th}$ grid is encoded as the second identification code, where i is set to a positive integer not greater than N; and determining the amount of distortion based on the number of grids identified as the first identification codes.

The memory 1302 may include one or more computer-readable storage media, where the computer-readable storage media may be non-transitory. The memory 1302 may also include a high-speed random access memory and a non-volatile memory such as one or more disk storage devices and flash storage devices. In some embodiments of this disclosure, a non-transitory computer-readable storage medium in the memory 1302 is configured to store at least one instruction, where the at least one instruction is executed by the processor 1301 to implement the method in the embodiments of this disclosure.

In some embodiments, the electronic device 1300 further includes a peripheral interface 1303 and at least one peripheral. The processor 1301, the memory 1302, and the peripheral interface 1303 can be connected through a bus or a signal cable. Each peripheral can be connected to the peripheral interface 1303 through a bus, a signal cable or a circuit board. In some embodiments, the peripheral includes at least one of a screen 1304, a camera 1305 and an audio circuit 1306.

The peripheral interface 1303 may be configured to connect at least one peripheral related to I/O (Input/Output) to the processor 1301 and the memory 1302. In some embodiments of this disclosure, the processor 1301, the memory 1302, and the peripheral interface 1303 are integrated on the same chip or circuit board; or in some other embodiments of this disclosure, any one or two of the processor 1301, the memory 1302 and the peripheral interface 1303 may be implemented on a separate chip or circuit board. This is not specifically limited in the embodiments of this disclosure.

The screen 1304 is configured to display a UI (User Interface). The UI can include a graphic, text, an icon, a video, and any combination thereof. When the screen 1304 is a touchscreen, the screen 1304 also has a capability of collecting a touch signal on or above a surface of the screen 1304. The touch signal may be input into the processor 1301 as a control signal for processing. In this case, the screen 1304 may also be configured to provide a virtual button and/or a virtual keyboard, which is also referred to as a soft button and/or a soft keyboard. In some embodiments, there may be one screen 1304 provided on a front panel of the electronic device 1300. In some embodiments, there may be at least two screens 1304 respectively provided on different surfaces of the electronic device 1300 or designed in a folded form. In some embodiments of this disclosure, the screen 1304 may be a flexible screen provided on a curved or folded surface of the electronic device 1300. In addition, the screen 1304 can also be set to be in a non-rectangular irregular pattern, that is, a special-shaped screen. The screen 1304 can be made of materials such as an LCD (Liquid Crystal Display) and an OLED (Organic Light-Emitting Diode).

The camera 1305 is configured to collect an image or a video. The camera 1305 includes a front-facing camera and a rear-facing camera. Usually, the front-facing camera is provided on the front panel of the electronic device, and the rear-facing camera is provided on the back of the electronic device. In some embodiments, there are at least two rear-facing cameras, and the at least two rear-facing cameras each are any one of a main camera, a depth-of-field camera, a wide-angle camera, and a telephoto camera, to integrate the main camera with the depth-of-field camera for a bokeh function and integrate the main camera with the wide-angle camera to implement panoramic photo shooting and VR (Virtual Reality) shooting functions or other integrated shooting functions. In some embodiments of this disclosure, the camera 1305 may also include a flash. The flash can be a single-color temperature flash or a dual color temperature flash. The dual color temperature flash refers to a combination of a warm light flash and a cold light flash and can be configured to compensate for light at different color temperatures.

The audio circuit 1306 may include a microphone and a speaker. The microphone is configured to collect sound waves of a user and an environment, convert the sound waves into an electrical signal, and input the electrical signal into the processor 1301 for processing. For a purpose of stereo collection or noise reduction, there may be a plurality of microphones provided in different parts of the electronic device 1300 respectively. The microphone may also be an array microphone or an omnidirectional collection microphone.

The power supply 1307 is configured to supply power to various components in the electronic device 1300. The power supply 1307 may be an alternating current power supply, a direct current power supply, a disposable battery, or a rechargeable battery. When the power supply 1307 includes the rechargeable battery, the rechargeable battery may be a wired rechargeable battery or a wireless rechargeable battery. The wired rechargeable battery is a battery charged through a cable and the wireless rechargeable battery is a battery charged through a wireless coil. The rechargeable battery can also be configured to support a quick charging technology.

The structural block diagram of the electronic device shown in the embodiments of this disclosure imposes no limitation on the electronic device 1300, and the electronic device 1300 may include more or less components than those shown in the figure, or combine some components, or use different component arrangements.

In the descriptions of this disclosure, the terms such as "first" and "second" are merely intended for description, instead of an indication or implication of relative importance. In the descriptions of this disclosure, "a plurality of" means two or more unless otherwise specified. Herein, "and/or" is an association relationship for describing associated objects and indicates that three relationships may exist. For example, A and/or B may mean the following three cases: Only A exists, both A and B exist, and only B exists. The character "/" generally indicates an "or" relationship between the associated objects.

What is claimed is:

1. A parking space identification method, wherein the method comprises:
   obtaining an around-view image of a target vehicle and determining a target region from the around-view image;
   segmenting the target region in a target direction to obtain multiple grids, wherein the target direction is perpendicular to a driving direction of the target vehicle; and
   determining a parking space based on image semanteme information corresponding to the multiple grids separately, wherein determining a parking space based on the image semanteme information corresponding to the multiple grids separately comprises:
   encoding the multiple grids separately based on the image semanteme information corresponding to the multiple grids separately, wherein when it is determined that an image region corresponding to the grid comprises at least one type of target object based on the image semanteme information, and a number of pixels of the at least one type of target object is not less than a corresponding pixel threshold, the grid is encoded as a first identification code, or otherwise, the grid is encoded as a second identification code; and
   when a number of grids encoded as the second identification code meets a preset condition within a preset distance range, determining that an image region corresponding to the preset distance range corresponds to a parking space, wherein the preset distance range is related to actual width of the parking space;
   when it is determined that there is a distorted image region in the around-view image based on image semanteme information of the around-view image, obtaining at least one frame of auxiliary image again;
   determining a partial image region corresponding to the distorted image region based on the at least one frame of auxiliary image; and
   determining an amount of distortion based on image semanteme information of the partial image region,
   wherein the determining the amount of distortion based on image semanteme information of the partial image region comprises:
   segmenting the partial image region in the target direction to obtain N grids, wherein N is set to an integer greater than 1;
   encoding an $i^{th}$ grid based on image semanteme information of the $i^{th}$ grid, wherein when it is determined that an image region corresponding to the $i^{th}$ grid comprises pixels of a vehicle type and a number of pixels is not less than a pixel threshold corresponding to the vehicle type based on the image semanteme information, the $i^{th}$ grid is encoded as the first identification code, or otherwise, the $i^{th}$ grid is encoded as the second identification code, wherein i is set to a positive integer not greater than N; and
   determining the amount of distortion based on the number of grids identified as the first identification codes.

2. The method according to claim 1, wherein after obtaining an around-view image of a target vehicle, the method further comprises:
   performing semantic segmentation processing on the around-view image to position a target object in the around-view image, wherein there is at least one type of target object.

3. The method according to claim 2, wherein target regions are on two sides of the target vehicle; and wherein segmenting the target region in a target direction to obtain multiple grids comprises:
   segmenting the target region in the target direction to obtain the multiple grids and image semanteme information corresponding to each grid, wherein:
   the image semanteme information corresponding to each grid comprises: a type of target object comprised in an image region corresponding to the grid, and a number of pixels of each type of target object; and image semanteme information corresponding to an auxiliary grid comprises: a type of target object comprised in an image region corresponding to the auxiliary grid, and the number of pixels of each type of target object; and
   the auxiliary grid is an adjacent grid of the target grid, and target grids are a preset number of grids at edge positions in all grids within the preset distance range.

4. The method according to claim 1, wherein after determining that the image region corresponding to the preset distance range corresponds to the parking space, the method further comprises:
   for a preset number of target grids at edge positions in all grids within the preset distance
   range, determining whether the target grid corresponds to intended parking space lines based on the image semanteme information corresponding to the target grid and the image semanteme information corresponding to the auxiliary grid, wherein the auxiliary grid is an adjacent grid of the target grid.

5. The method according to claim 4, wherein the determining whether the target grid corresponds to the intended parking space lines based on the image semanteme information corresponding to the target grid and the image semanteme information corresponding to the auxiliary grid further comprises:
   determining whether the target grid meets a condition to be encoded as the first identification code;
   determining whether there is a grid encoded as the second identification code in the auxiliary grid; and
   when the target grid is encoded as the first identification code and there is the grid encoded as the second identification code in the auxiliary grid, determining that the target grid corresponds to the intended parking space lines.

6. The method according to claim 1, wherein after determining the parking space based on the image semanteme information corresponding to the multiple grids separately, the method further comprises:
   determining whether an image region corresponding to a grid comprises pixels of a parking space line type and a number of pixels is not less than a pixel threshold of the parking space line type based on image semanteme information of the grid; and
   when the grid comprises the pixels of the parking space line type and the number of pixels is not less than the pixel threshold of the parking space line type, determining that the grid corresponds to the parking space lines.

7. A non-transitory computer-readable storage medium, storing a computer program, wherein when the computer program is executed by a processor, the parking space identification method according to claim 1 is implemented.

8. A parking space identification apparatus, wherein the apparatus comprises a processor, wherein the processor is used to execute following program modules stored in a memory:

an obtaining module, configured to obtain an around-view image of a target vehicle and determine a target region from the around-view image;

a segmentation module, configured to segment the target region in a target direction to obtain multiple grids, wherein the target direction is perpendicular to a driving direction of the target vehicle; and a first determining module, configured to determine a parking space based on image semanteme information corresponding to the multiple grids separately, wherein the first determining module is specifically configured to:

encode the multiple grids separately based on the image semanteme information corresponding to the multiple grids separately, wherein when it is determined that an image region corresponding to the grid comprises at least one type of target object based on the image semanteme information, and a number of pixels of the at least one type of target object is not less than a corresponding pixel threshold, the grid is encoded as a first identification code, or otherwise, the grid is encoded as a second identification code; and when a number of grids encoded as the second identification code meets a preset condition within a preset distance range, determine that an image region corresponding to the preset distance range corresponds to a parking space, wherein the preset distance range is related to actual width of the parking space;

a second determining module, configured to:

obtain at least one frame of auxiliary image again, when it is determined that there is a distorted image region in the around-view image based on image semanteme information of the around-view image;

determine a partial image region corresponding to the distorted image region based on the at least one frame of auxiliary image; and determine an amount of distortion based on image semanteme information of the partial image region, wherein determining an amount of distortion based on image semanteme information of the partial image region comprises:

segmenting the partial image region in the target direction to obtain N grids, wherein N is set to an integer greater than 1;

encoding an $i^{th}$ grid based on image semanteme information of the $i^{th}$ grid, wherein when it is determined that an image region corresponding to the $i^{th}$ grid comprises pixels of a vehicle type and a number of pixels is not less than a pixel threshold corresponding to the vehicle type based on the image semanteme information, the $i^{th}$ grid is encoded as the first identification code, or otherwise, the $i^{th}$ grid is encoded as the second identification code, wherein i is set to a positive integer not greater than N; and determining the amount of distortion based on the number of grids identified as the first identification codes.

* * * * *